United States Patent
Kanda

Patent Number: 5,936,997
Date of Patent: *Aug. 10, 1999

[54] SPREAD SPECTRUM COMMUNICATION METHOD

[75] Inventor: Tetsuo Kanda, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/450,685

[22] Filed: May 25, 1995

[30] Foreign Application Priority Data

Jun. 8, 1994 [JP] Japan .................................. 6-150398
May 1, 1995 [JP] Japan .................................. 7-131106

[51] Int. Cl.$^6$ .......................... H04B 15/00; H04K 1/00; H04L 27/30
[52] U.S. Cl. ........................................... 375/200; 375/207
[58] Field of Search ..................................... 375/200–206, 375/208, 222, 260, 279, 283, 308, 329, 333

[56] References Cited

U.S. PATENT DOCUMENTS

| | | | |
|---|---|---|---|
| 4,660,214 | 4/1987 | Pahlavan et al. | 375/262 |
| 5,144,641 | 9/1992 | Akazawa et al. | 375/200 |
| 5,228,055 | 7/1993 | Uchida et al. | 375/208 |
| 5,291,515 | 3/1994 | Uchida et al. | 375/200 |
| 5,371,671 | 12/1994 | Daffara et al. | 375/200 |
| 5,379,047 | 1/1995 | Yokev et al. | 375/200 X |

FOREIGN PATENT DOCUMENTS 0622920  11/1994  European Pat. Off. .

*Primary Examiner*—Chi H. Pham
*Assistant Examiner*—Bryan Webster
*Attorney, Agent, or Firm*—Fitzpatrick, Cella, Harper & Scinto

[57] ABSTRACT

A spread spectrum communication method in which, on the transmission side, each item of parallel data is spread with a different code, and is encoded into a combination of I-channel and Q-channel signals. On the reception side, the combination of I-channel and Q-channel signals is encoded to correlate it with each of a plurality of codes.

31 Claims, 9 Drawing Sheets

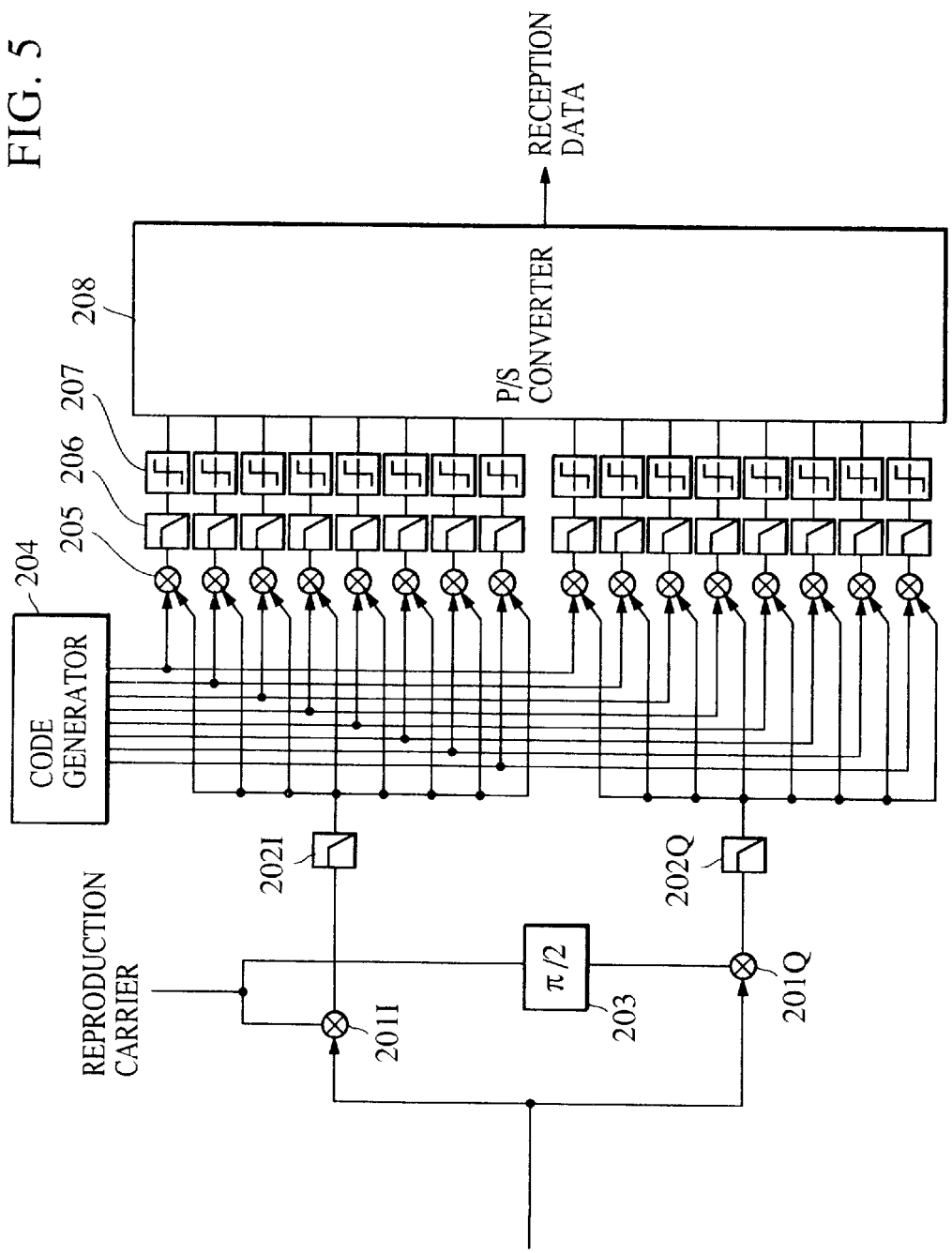

SPREAD SPECTRUM COMMUNICATION METHOD

BACKGROUND OF THE INVENTION

1. Field of the Invention

The present invention relates to a spread spectrum communication method in which a plurality of items of data are spread by using a plurality of sets of spreading codes.

2. Description of the Related Art

In connection with spread spectrum communication, a code division multiplex communication system has been proposed, according to which the low cross-correlation characteristic of spreading codes is utilized to multiplex a plurality of communication paths in the same band, thereby attaining an increase in information transmitting speed (U.S. Ser. No. 08/233,244 filed on Apr. 26, 1994).

Apart from this, orthogonal modulation/demodulation techniques utilizing the orthogonality of the I and Q-components of a carrier, for example, m-phase shift modulation (m-PSK) and orthogonal amplitude modulation (QAM), have also been proposed as a means for attaining an increase in information transmitting speed within a limited band.

FIG. 4 is a circuit diagram showing an example of the construction of a code division multiplexing modulation circuit using orthogonal modulation when the multiplexing number is 16, as shown in U.S. Ser. No. 08/233,244.

First, high-speed transmission data is converted to 16 items of parallel data by a serial/parallel converter 101. These items of parallel data are divided into a group which is to be modulated to the I-channel of a carrier and a group which is to be modulated to the Q-channel of the carrier, each group consisting of 8 items. When the transmission data is input as parallel data beforehand, the serial/parallel converter 101 is not needed.

These items of parallel data are respectively subjected to spread spectrum modulation by a plurality of different spreading codes, generated by a spreading code generator 110, and exclusive "OR" circuits 102, and added by adders 103I and 103Q, whereby multiplexing signals of I and Q-components are obtained.

In code division multiplexing, the spreading codes used should be, in principle, all different from each other. However, in this example, in which orthogonal modulation is effected, the orthogonality of both phases at the time of carrier modulation is ensured, so that, unless the same spreading code is used in a set, it is possible to use the same spreading code for both in-phase and orthogonal components.

In the present example, eight spreading codes are prepared, each of which is used for I and Q components. Since eight signals of the same weight are multiplexed in each set, the code division multiplexing signal assumes the nine values of 0 to 8.

The code division multiplexing signals thus multiplexed are converted to analog base band signals by digital/analog converters 105I and 105Q, respectively, and, further, are carrier-modulated to in-phase and orthogonal components by balanced modulators 106I and 106Q and a $\pi/2$ phase shifter 107 with respect to a carrier generated by a local oscillator 108. The signals are then synthesized by a power synthesizer 109, whereby a code division multiplexing orthogonal modulation output is obtained.

At this time, the signal points in the phase arrangement diagram of this modulation output assume a phase arrangement similar to a QAM modulation, which assumes 81 values, as shown in FIG. 6.

Next, FIG. 5 is a circuit diagram showing the construction of a demodulation circuit as disclosed in U.S. Ser. No. 08/233,244.

First, a reception signal is transferred by way of analog multipliers 201I and 201Q, low-pass filters 202I and 202Q, and a $\pi/2$ phase shifter 203, and is subjected to synchronous detection by a reproduction carrier reproduced in the receiver, whereby base band signals of I-channel and Q-channel components are obtained. When a correlation computation is performed on these detection outputs by using an analog multiplier 205 and a low-pass filter 206 with respect to spreading codes generated by a code generator 204, the code division multiplexing signals undergo reverse spread processing to be thereby demodulated into 16 items of parallel data.

These items of parallel data are converted to a digital level by a comparator 207, and finally converted to high-speed reception data by a parallel/serial converter 208.

In this way, a communication path is multiplexed by using a code division multiplexing communication system and an orthogonal modulation/demodulation technique, thereby attaining an increase in information transmitting speed.

However, as the use of an equalizer is a prerequisite in narrow-band QAM transmission, the above-described conventional technique has a problem in that a deterioration in error rate characteristics is involved due to the small inter-signal distance in the phase arrangement diagram of the orthogonal modulator output, although a processing gain can be expected in spread spectrum communication.

SUMMARY OF THE INVENTION

It is an object of the present invention to achieve an increase in speed in spread spectrum communication.

Another object of the present invention is to realize a noise-resistant spread spectrum communication.

Still another object of the present invention is to provide a spread spectrum modulation method in which a combination of I-channel and Q-channel signals is determined by encoding a plurality of items of spread data.

A further object of the present invention is to provide a spread spectrum demodulation method in which reception data is obtained by decoding a combination of I-channel and Q-channel signals and, further, correlating a plurality of codes.

Other objects of the present invention will become apparent from the following description of preferred embodiments.

BRIEF DESCRIPTION OF THE DRAWINGS

FIG. 5 is a circuit diagram showing the construction of a demodulation circuit as shown in U.S. Ser. No. 08/233,244;

DETAILED DESCRIPTION OF THE PREFERRED EMBODIMENTS

Figure 1:
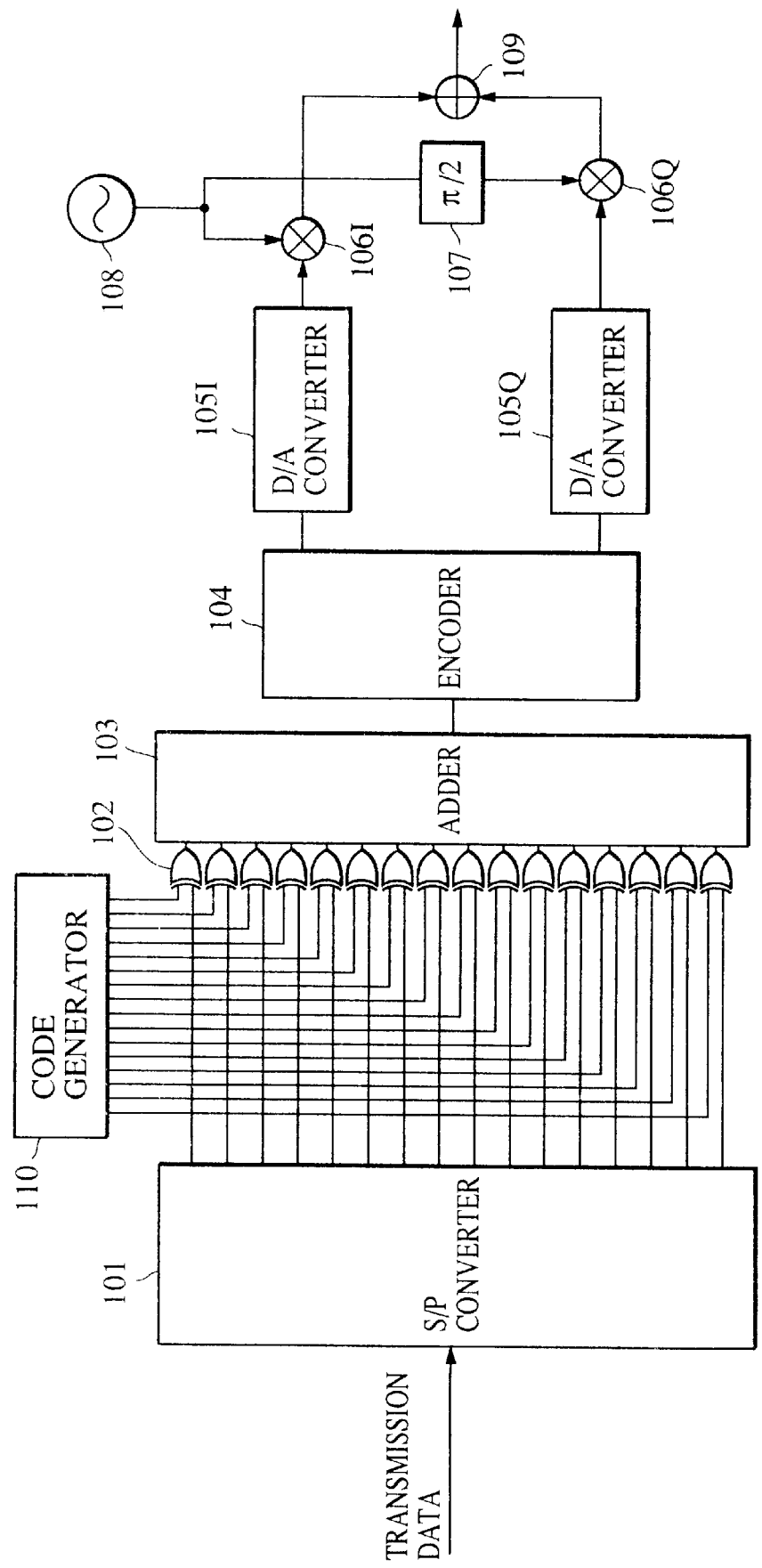
FIG. 1 is a circuit diagram showing the construction of a modulation circuit according to a first embodiment of the present invention.

FIG. 1 is a circuit diagram showing the construction of a modulation circuit according to the first embodiment of the present invention.

In this embodiment also, it will be assumed that the multiplexing number is 16. First, 16 items of parallel data obtained by a serial-parallel converter 101 are subjected to spread spectrum modulation by 16 different codes, generated by a code generator 110, and exclusive "OR" circuits 102. These 16 spread spectrum signals are converted to a code division multiplexing signal, which assumes 17 values of 0 to 16, by an adder 103.

When the transmission data is input beforehand as parallel data, it is not necessary to provide the serial/parallel converter 101.

This multiplexing signal is encoded with respect to the I and Q-channels such that a one-to-one arrangement of signal points is realized in the phase arrangement diagram when orthogonal modulation is effected by an encoder 104. The output of the encoder 104 is converted to analog base band signals by two digital/analog converters 105I and 105Q. The analog base band signals are subjected to orthogonal modulation by a π/2 phase shifter 107, two balanced modulators 106I and 106Q, and a power synthesizer 109 with respect to a carrier generated by a local oscillator 108.

It is also possible to encode the outputs of the exclusive "OR" circuits 102 without adding them.

Figure 3:
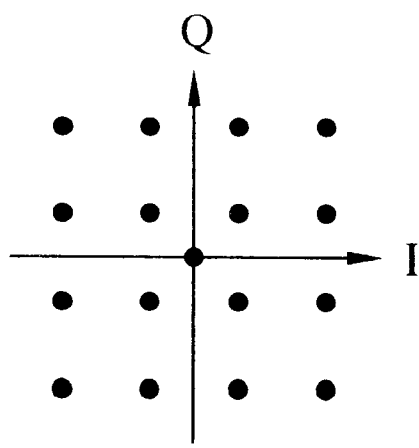
FIG. 3 is a phase arrangement diagram of signal points in the first embodiment.
Figure 6:
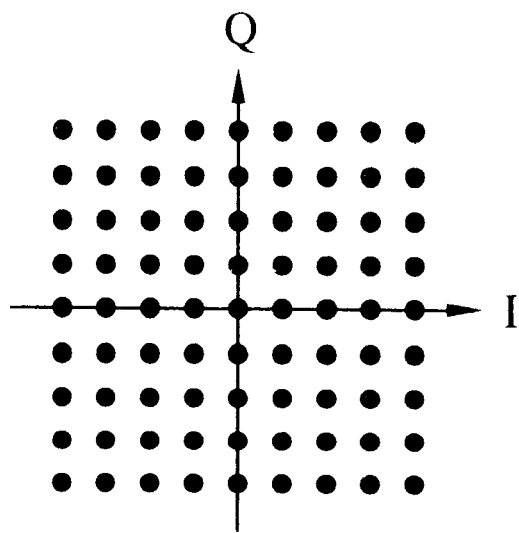
FIG. 6 is a phase arrangement diagram of signal points as shown in U.S. Ser. No. 08/233,244.
Figure 4:
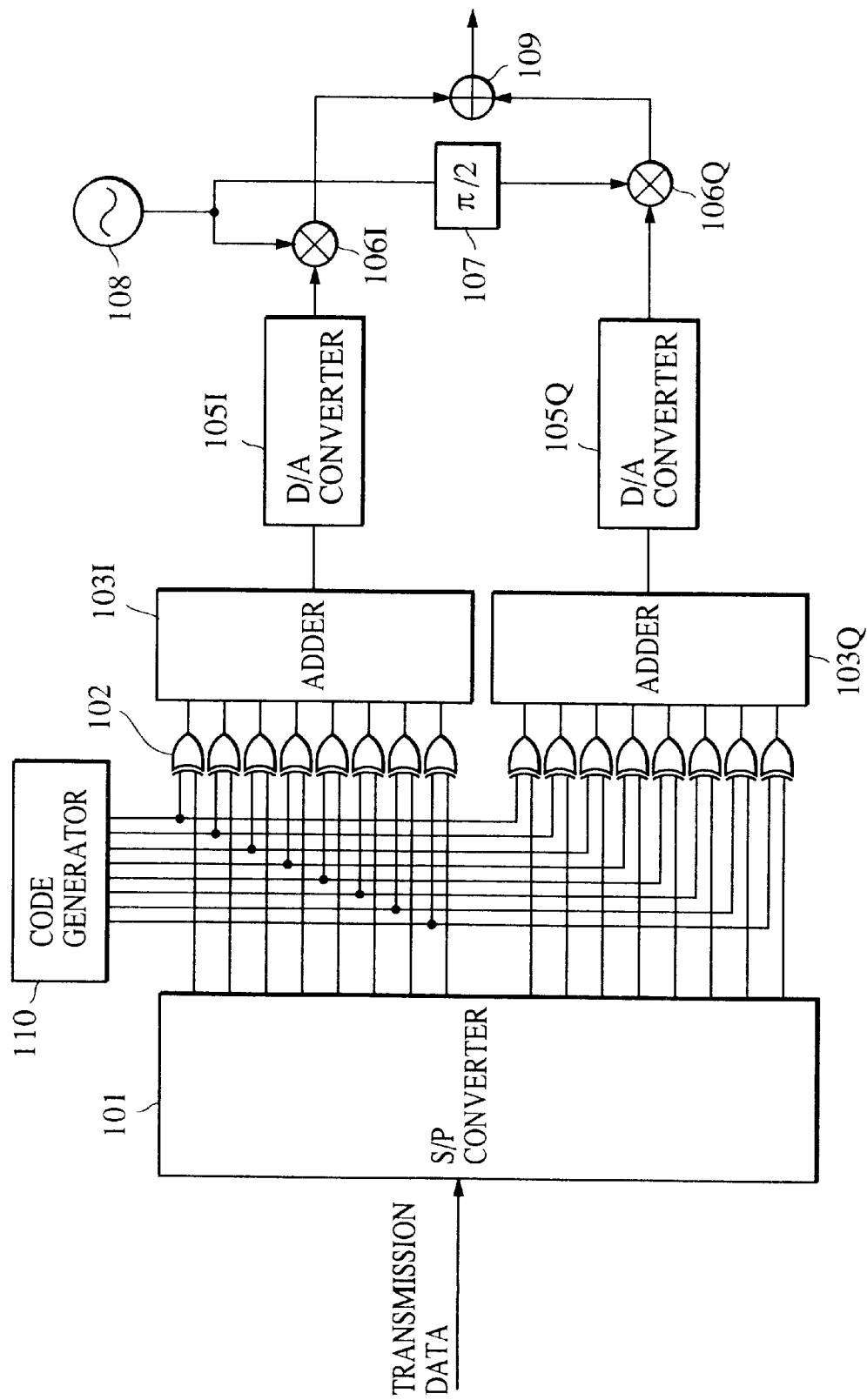
FIG. 4 is a circuit diagram showing the construction of a modulation circuit as shown in U.S. Ser. No. 08/233,244.

At this time, a 17-value mapping, for example, is possible in the phase arrangement diagram of the orthogonal modulation output, as shown in FIG. 3, so that, when the total power is constant, it is possible for the inter-signal-point distance to be larger as compared to that in the example shown in FIG. 6.

Figure 2:
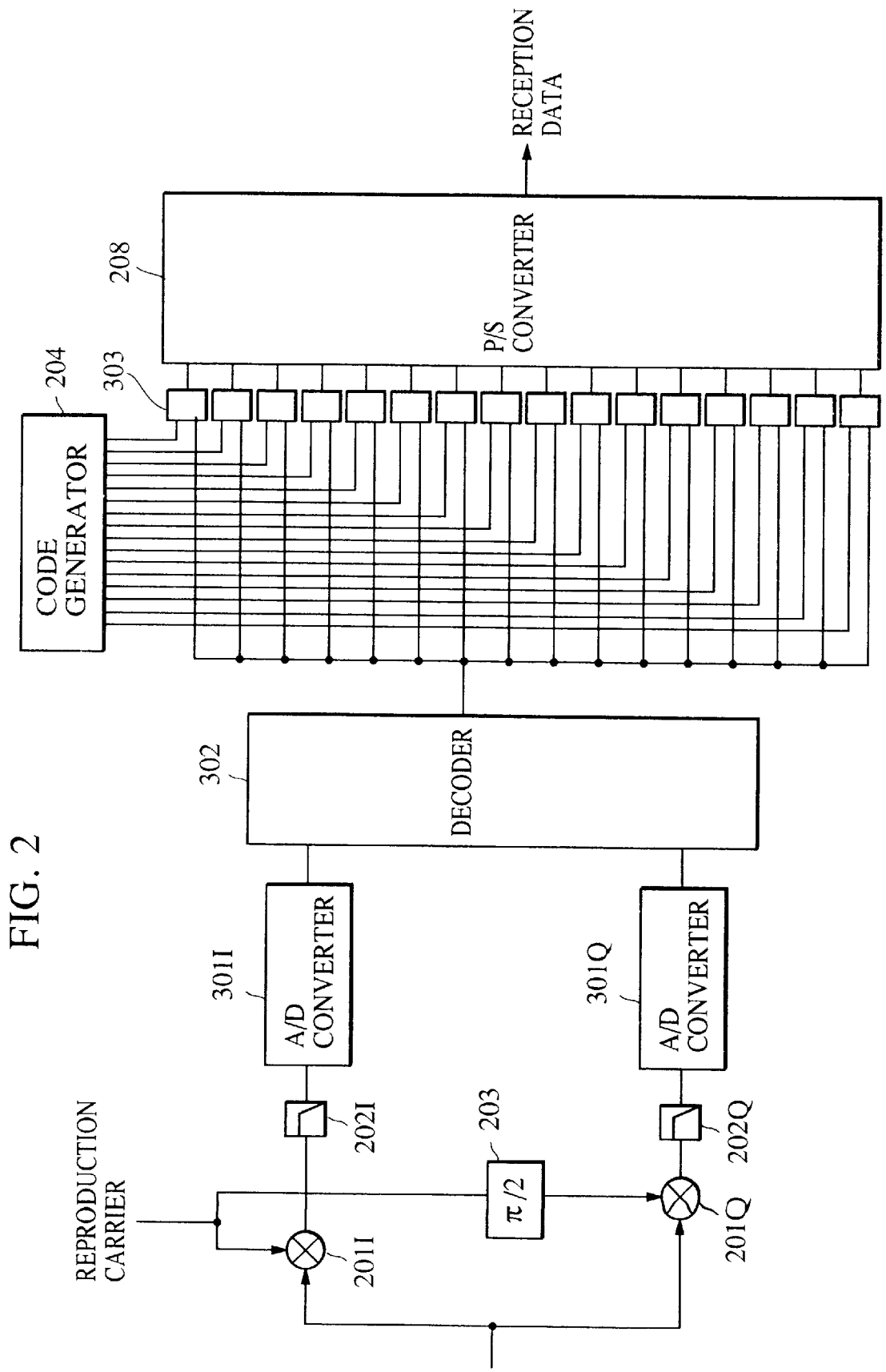
FIG. 2 is a circuit diagram showing the construction of a demodulation circuit according to the first embodiment.

Next, FIG. 2, a circuit diagram showing the construction of a demodulation circuit according to the first embodiment, will be described.

First, the I-channel and Q-channel components of a reception signal are subjected to base-band orthogonal detection through a reproduction carrier generated in the receiver, by using analog multipliers 201I and 201Q and low-pass filters 202I and 202Q, and a π/2 phase shifter 203.

These base band signals are converted to digital signals by two analog/digital converters 301I and 301Q, and are then decoded into the original 16-channel code division multiplexing signal by a decoder 302.

Finally, reverse spreading is effected on this multiplexing signal by a spreading signal, generated by a code generator 204, and a digital correlator 303, and high-speed reception data is obtained through parallel/serial conversion.

Figure 7:
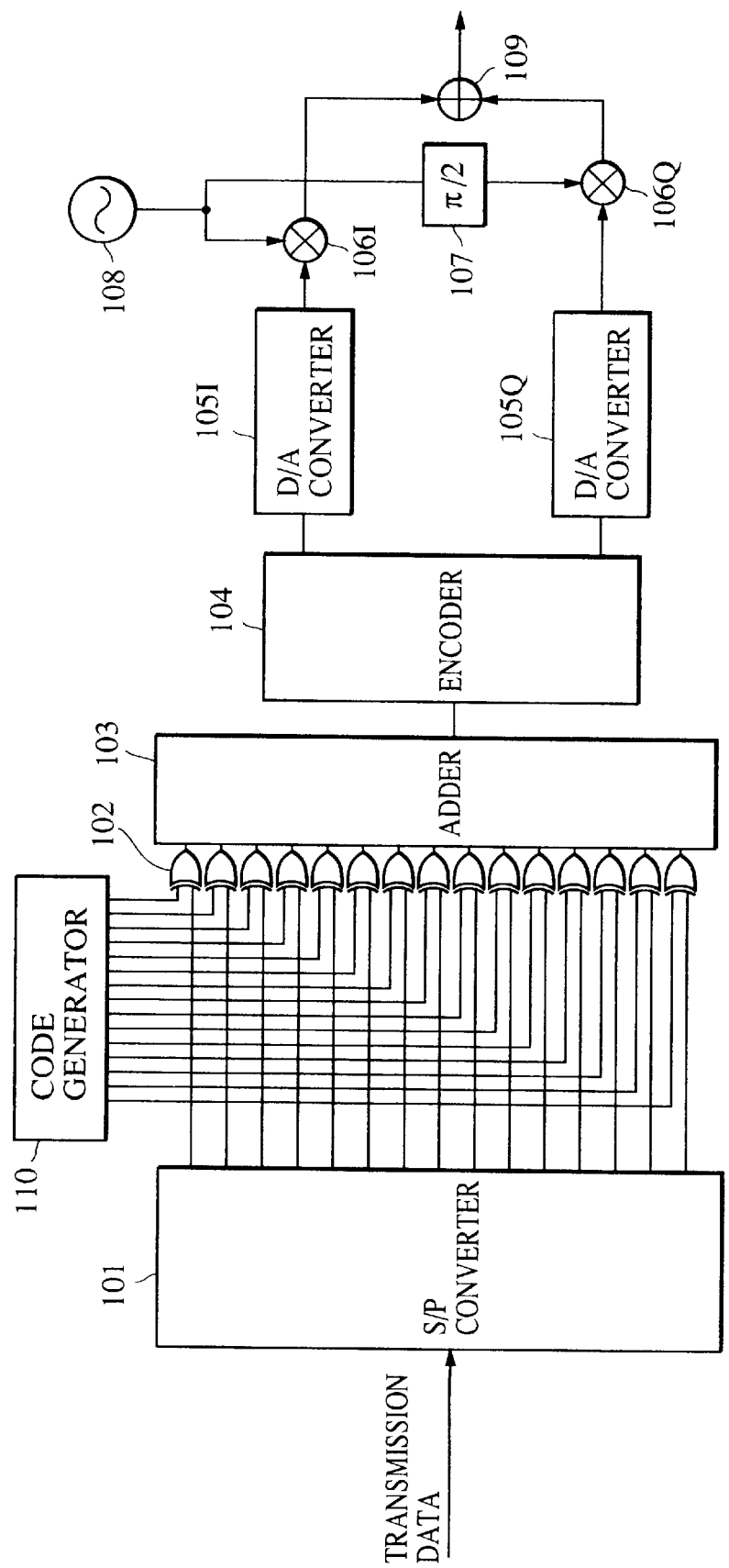
FIG. 7 is a schematic diagram showing the construction of a modulation circuit according to a second embodiment of the present invention.

FIG. 7 shows the construction of a modulation circuit according to the second embodiment of the present invention. In the second embodiment, it will be assumed that the code division multiplexing number is 15. In FIG. 7, high-speed transmission data is first divided into 15 low-speed information signals by a serial/parallel converter 101. As in the first embodiment, the 15 items of parallel data thus obtained are subjected to spread spectrum modulation by exclusive "OR" circuits 102, and these 15 spread spectrum signals are turned into a code division multiplexing signal, which can assume one of the 16 values of 0 to 15, by the adder 103.

Here, an encoder 104 performs encoding on the I and Q-channels such that a one-to-one arrangement of signal points is effected in the phase arrangement diagram. The input signal supplied to the encoder 104 as a code division multiplexing value ranges from 0 to 15, and is given as a 4-bit binary signal. However, when arranging these code division multiplexing values in a rectangular coordinate system as described above, it is possible to assign the higher 2 bits and the lower 2 bits of the 4-bit multiplexing values to the Q and I-channels, respectively.

As in the first embodiment, the I and Q-channels thus encoded are converted to analog base band signals by two digital/analog converters 105I and 105Q and are subjected to orthogonal modulation by two balanced modulators 106I and 106Q, and a power synthesizer 109.

Figure 9:
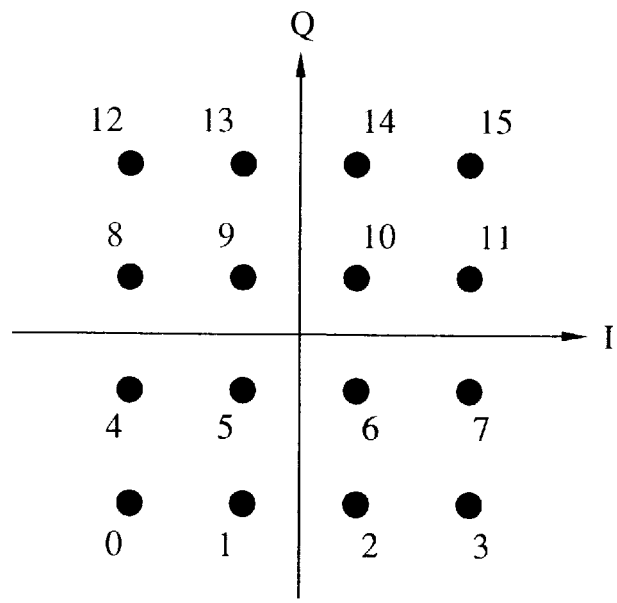
FIG. 9 is a phase arrangement diagram of signal points in the second embodiment of the present invention.
Figure 10:
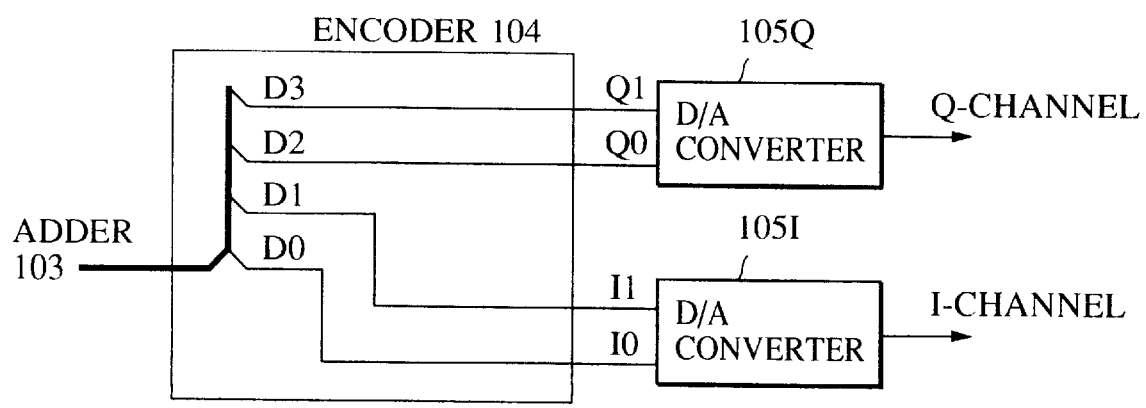
FIG. 10 is a diagram showing an example of the construction of an encoder according to the second embodiment of the present invention.

When an encoding circuit according to the second embodiment, shown in FIG. 10, is used, the signal point arrangement of the orthogonally modulated signals is as shown in FIG. 9. When compared with the signal points in the example shown in FIG. 6, the signal points of this example can have a larger inter-signal-point distance under the condition in which the total signal power is constant, so that an improvement can be achieved in terms of allowance for noise.

Figure 8:
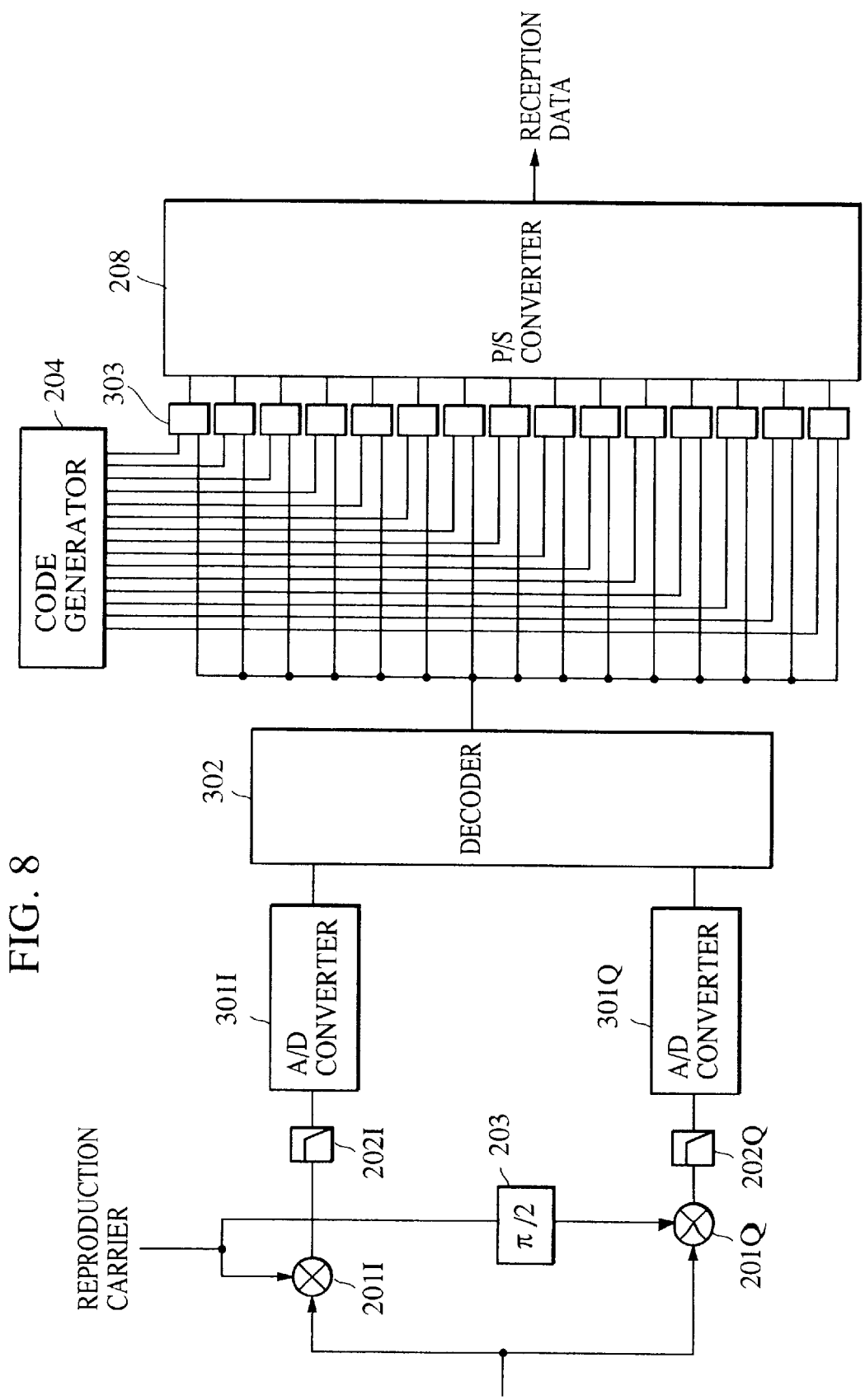
FIG. 8 is a schematic diagram showing the construction of a demodulation circuit according to the second embodiment of the present invention.

Next, FIG. 8 shows the construction of a demodulation circuit according to the second embodiment. As in the first embodiment, the I-channel and Q-channel components are subjected to base band orthogonal detection through a reproduction carrier reproduced in the receiver, by using analog multipliers 201 and low-pass filters 202I and 202Q. Then, these base band signals are converted to digital signals by two analog/digital converters 301I and 301Q, and then decoded into the original 15-channel code division multiplexing signal by a decoder 302. Finally, reverse spreading is effected on this multiplexing signal by a spread code generated by a code generator 204 and a digital correlator 303, and high-speed reception data is obtained through parallel/serial conversion.

In the second embodiment, the upper and lower 2 bits of the 4-bit multiplexing signals are respectively assigned to the I and Q-channels when the code division multiplexing values are mapped on the signal points. However, in connection with the signal point arrangement by the encoder, the present invention is only restrained by the stipulation that the number which can be assumed by the signal obtained by multiplexing must be the same as the number of signal points. There is no restriction regarding the mapping method.

Assuming that the code division multiplexing number is 15, the multiplexing value is 0 or 15 if the polarities of all the 15 spectrum-spread information symbols are the same. Conversely, as the difference in number of the symbol '1' and symbol '0' of the 15 symbols diminishes, the code division multiplexing value approaches 7 or 8. The decoder performs correlation computation on such a multiplexing signal with respect to an arbitrary series of the multiplexing codes, thereby decoding the information symbols of the information channels. Taking this process of correlation decoding into account, the multiplexing signal having the value of 0 or 15 has a larger weight as compared to the other multiplexing values.

Figure 11:
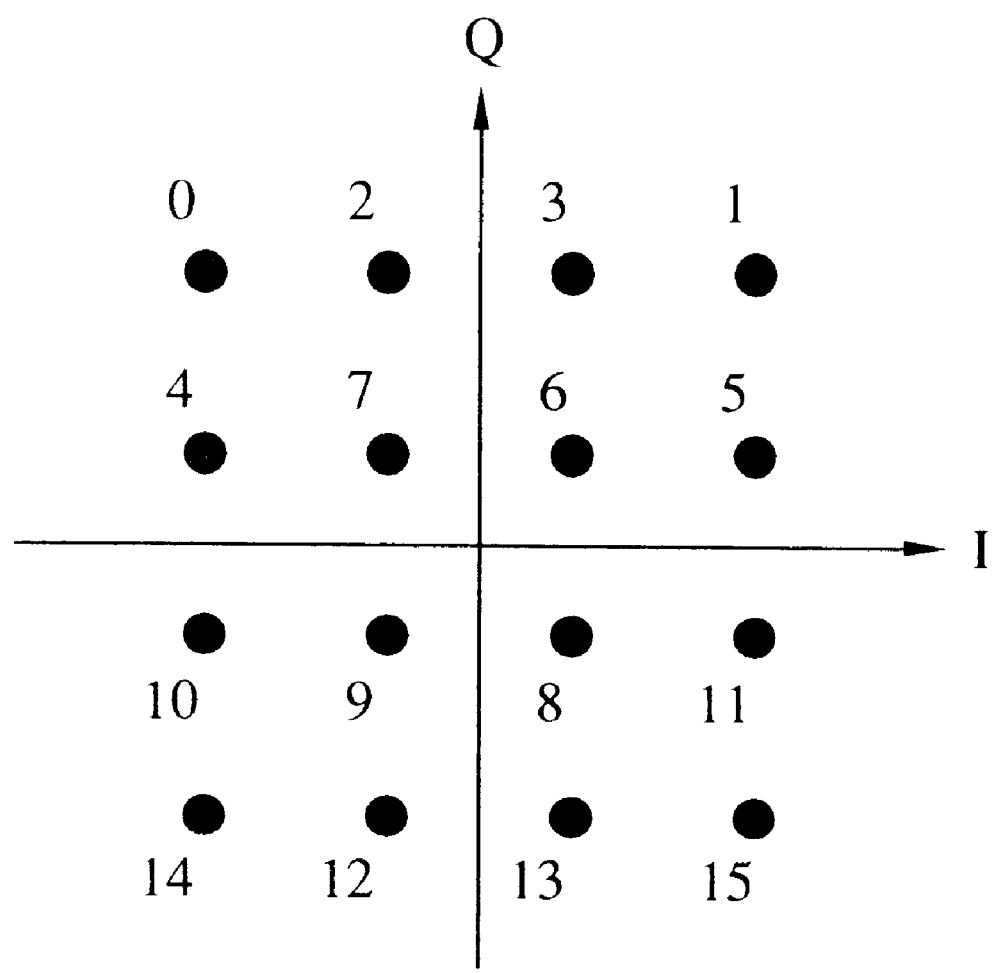
FIG. 11 is a phase arrangement diagram of signal points in a third embodiment of the present invention.

Thus, in the third embodiment, when arranging the code division multiplexing signals on the signal points, the code division multiplexing value of 0 or 15 is arranged at a signal point where a relatively large signal power is available than in the case of a code division multiplexing value of 7 or 8. That is, in accordance with the third embodiment, as shown in FIG. 11, an encoder which effects an arrangement of different signal powers, and a decoder which effects a mapping reverse to that, are used with respect to each of the values that the code division multiplexing signal can assume, in accordance with the weight thereof. When the number of signal points, that is, the code division multiplexing number, is small, such encoder and decoder can be realized in the form of logic circuits based on logic gates. Further, even if the code division multiplexing number is large, they can be realized in the form of a look-up table system based on memory or the like.

Although the present invention has been described with reference to preferred embodiments, it is understood that the present invention is not restricted to the constructions of the above-described embodiments, and various modifications are possible without departing from the scope of the claims. For example, regarding the details of the methods of modulating and demodulating the I-channel and Q-channel signals, various well-known methods are applicable.

What is claimed is:

1. A spread spectrum communication method comprising:
   a processing step for processing parallel data by a plurality of sets of spreading codes;
   a synthesizing step for synthesizing the parallel data processed by the plurality of sets of spreading codes to form synthesized parallel data;
   a communicating step for communicating the parallel data processed by the plurality of sets of spreading codes on first and second phases of a carrier; and
   a determining step for determining an allocation between the synthesized parallel data and an encoded combination of a first value for the first phase and a second value for the second phase for said communicating step,
   wherein the encoded combination is selected from a plurality of first signal points whose inter-signal-point distance is larger than that of second points whose first values for the first phase are decided from a part of the processed parallel data and second values for the second phase are decided from a rest of the processed parallel data.

2. A method according to claim 1, wherein said synthesizing step adds the parallel data processed by the plurality of sets of spreading codes.

3. A method according to claim 2, wherein the determining step determines energies of a first signal on the first phase and a second signal on the second phase out of a predetermined range to be larger than that of the first and second signals within the predetermined range.

4. A method according to claim 1, wherein the first and second phases are orthogonal phases.

5. A method according to claim 1, wherein said communicating step includes a generating step for generating a second carrier by shifting a phase of a first carrier.

6. A method according to claim 1, wherein said communicating step includes an adding step for adding a first signal on the first phase and a second signal on the second phase.

7. A method according to claim 1, wherein said processing step includes a spreading step for spreading the parallel data by a plurality of sets of spreading codes.

8. A method according to claim 1, wherein the parallel data represents code division multiplexing signals.

9. A spread spectrum communication apparatus comprising:
   spreading means for spreading a set of data by a plurality of sets of spreading codes to provide a set of spread data;
   synthesizing means for synthesizing the set of spread data;
   determining means for determining an allocation between the synthesized set of spread data and an encoded combination of a first value and a second value; and
   communicating means for communicating a first signal having the first value and a second signal having the second value on first and second phases of a carrier,
   wherein the encoded combination is selected from a plurality of first signal points whose inter-signal-point distance is larger than that of second points whose first values for the first phase are decided from a part of the set of spread data and second values for the second phase are decided from a rest of the set of spread data.

10. An apparatus according to claim 9, wherein said synthesizing means includes adding means for adding the set of spread data, and said determining means determines the allocation between an output of said adding means and the encoded combination of the first and second signals.

11. An apparatus according claim 9, wherein said determining means determines energies of the first and second signals to be allocated to the set of spread data out of a predetermined range to be larger than that of the first and second signals to be allocated to the set of spread data within the predetermined range.

12. An apparatus according to claim 9, wherein the first and second phases are orthogonal phases.

13. An apparatus according to claim 9, wherein said communicating means includes generating means for generating a second carrier by shifting a phase of a first carrier.

14. An apparatus according to claim 9, wherein said communicating means includes adding means for adding the first signal and the second signal.

15. An apparatus according to claim 9, wherein the set of spread data represents code division multiplexing signals.

16. A spread spectrum communication apparatus comprising:
   spreading means for spreading communication data; and
   selecting means for selecting one of first signal points of a phase arrangement for the spread communication data, an inter-signal-point distance of the first signal points being larger than that of second signal points whose first phase values are decided from a part of the spread communication data and second phase values are decided from a rest of the spread communication data.

17. An apparatus according to claim 16, wherein the inter-signal-point distance of the first signal points is larger than that of second signal points in a case where a total power is constant.

18. An apparatus according to claim 16, wherein said spreading means includes adding means for adding the spread communication data, and said selecting means selects one of the first signal points based on the added spread communication data.

19. An apparatus according to claim 16, wherein said spreading means includes adding means for adding all of the spread communication data, and said selecting means selects one of the first signal points based on the added spread communication data.

20. A spread spectrum communication method comprising the steps of:

spreading communication data; and selecting one of first signal points of a phase arrangement for the spread communication data, an inter-signal-point distance of the first signal points being larger than that of second signal points whose first phase values are decided from a part of the spread communication data and second phase values are decided from a rest of the spread communication data.

21. A method according to claim 20, wherein the inter-signal-point distance of the first signal points is larger than that of second signal points in a case where a total power is constant.

22. A method according to claim 20, wherein said spreading step includes an adding step of adding the spread communication data, and said selecting step selects one of the first signal points based on the added spread communication data.

23. A method according to claim 20, wherein said spreading step includes an adding step of adding all of the spread communication data, and said selecting step selects one of the first signal points based on the added spread communication data.

24. A spread spectrum communication apparatus comprising:

decoding means for decoding a phase arrangement for received spread spectrum data which is encoded by a transmitting side such that an inter-signal-point distance of the phase arrangement for the spread spectrum data is larger than that of a phase arrangement whose first phase values are decided from a part of the spread communication data and second phase values are decided from a rest of the spread communication data; and de-spreading means for de-spreading the decoded spread spectrum data.

25. An apparatus according to claim 24, wherein the received spread spectrum data is encoded by the transmitting side such that the inter-signal-point distance of the phase arrangement for the spread spectrum data is larger than that of the phase arrangement whose first phase values are decided from the part of the spread communication data and second phase values are decided from the rest of the spread communication data in a case where a total power is constant.

26. An apparatus according to claim 24, wherein said decoding means includes demodulating means for demodulating a received signal into first and second phase values of the received signal, and said decoding means decodes the first and second phase values representing the phase arrangement for the received spread spectrum data.

27. An apparatus according to claim 24, wherein said decoding means includes demodulating means for demodulating a received signal into first and second phase values of the received signal, and said decoding means decodes a combination of the first and second phase values representing the phase arrangement for the received spread spectrum data.

28. A spread spectrum communication method comprising the steps of:

decoding a phase arrangement for received spread spectrum data which is encoded by a transmitting side such that an inter-signal-point distance of the phase arrangement for the spread spectrum data is larger than that of a phase arrangement whose first phase values are decided from a part of the spread communication data and second phase values are decided from a rest of the spread communication data; and de-spreading the decoded spread spectrum data.

29. A method according to claim 28, wherein the received spread spectrum data is encoded by a transmitting side such that the inter-signal-point distance of the phase arrangement for the spread spectrum data is larger than that of the phase arrangement whose first phase values are decided from the part of the spread communication data and second phase values are decided from the rest of the spread communication data in a case where a total power is constant.

30. A method according to claim 28, wherein said decoding step includes a demodulating step of demodulating a received signal into first and second phase values of the received signal, and said decoding step decodes the first and second phase values representing the phase arrangement for the received spread spectrum data.

31. A method according to claim 28, wherein said decoding step includes a demodulating step of demodulating a received signal into first and second phase values of the received signal, and said decoding step decodes a combination of the first and second phase values representing the phase arrangement for the received spread spectrum data.

* * * * *